(12) United States Patent
Willis

(10) Patent No.: US 7,828,463 B1
(45) Date of Patent: Nov. 9, 2010

(54) LUNAR RESONANT LIGHTING

(76) Inventor: Anton Michael Willis, 4722 Market St., #2, Oakland, CA (US) 94608

( * ) Notice: Subject to any disclaimer, the term of this patent is extended or adjusted under 35 U.S.C. 154(b) by 374 days.

(21) Appl. No.: 12/148,776

(22) Filed: Apr. 21, 2008

Related U.S. Application Data

(60) Provisional application No. 60/926,142, filed on Apr. 25, 2007.

(51) Int. Cl.
F21V 14/00 (2006.01)
F21V 37/00 (2006.01)
F21S 13/10 (2006.01)
E01F 9/00 (2006.01)

(52) U.S. Cl. ............... 362/276; 362/431; 362/153.1; 362/642

(58) Field of Classification Search ........... 362/153.1, 362/145, 276, 642, 802, 431
See application file for complete search history.

(56) References Cited

U.S. PATENT DOCUMENTS

| | | | |
|---|---|---|---|
| 4,209,728 A | 6/1980 | Membreno | |
| 4,841,164 A | 6/1989 | Basso | |
| 5,195,016 A | 3/1993 | Powers | |
| 5,648,656 A | 7/1997 | Begemann | |
| 5,923,028 A | 7/1999 | Turnbull | |
| 6,114,813 A | 9/2000 | Lo et al. | |
| 6,390,647 B1 | 5/2002 | Shaefer | |
| 6,583,573 B2 | 6/2003 | Bierman | |
| 6,676,279 B1 | 1/2004 | Hubbell | |
| 6,831,261 B2 | 12/2004 | Schofield | |
| 7,055,986 B2 | 6/2006 | Littleton | |
| 7,164,110 B2 | 1/2007 | Pitigoi-Aron | |
| 7,181,876 B1 | 2/2007 | Ahmadi | |
| 7,438,438 B2 * | 10/2008 | Sandell | 362/276 |
| 2005/0047133 A1 * | 3/2005 | Pitigoi-Aron et al. | 362/231 |
| 2005/0128751 A1 * | 6/2005 | Roberge et al. | 362/276 |
| 2009/0034258 A1 * | 2/2009 | Tsai et al. | 362/253 |
| 2009/0040750 A1 * | 2/2009 | Myer | 362/183 |

* cited by examiner

Primary Examiner—Jacob Y Choi
(74) Attorney, Agent, or Firm—Howard Cohen

(57) ABSTRACT

A method and apparatus to control a lighting source such as a streetlight and modulate the output of the lighting source so that artificial illumination is reduced when moonlight is available to illuminate the area. The apparatus includes a sensor assembly for detecting moonlight in the night sky, an electronic circuit for processing the sensor signals in combination with moonrise and moonset data, and modulating the power applied to the lighting source in response to the intensity of the incident moonlight.

13 Claims, 6 Drawing Sheets

LUNAR RESONANT LIGHTING

CROSS-REFERENCE TO RELATED APPLICATIONS

This application claims the benefit of the priority of the filing date of U.S. Provisional Application 60/926,142, filed Apr. 25, 2007.

FEDERALLY SPONSORED RESEARCH

Not applicable.

SEQUENCE LISTING, ETC ON CD

Not applicable.

BACKGROUND OF THE INVENTION

1. Field of the Invention

The present invention relates to area lighting fixtures and systems such as streetlights for highways, roads, walkways and other public areas, as well as porch, security, and garden lights for private outdoor uses. Alternatively, the fixtures and system can be used for indoor lighting such as that used in office buildings. The lighting fixtures and system uses discrete energy-saving light sources, such as LEDs, and a method for automatically adjusting the light and energy output based on the amount of ambient light available to light the intended target area. Streetlights, for example, inversely resonate with the amount of ambient moonlight, thus dimming and brightening each month as the moon cycles through its phases. The utilization of available ambient light to adequately illuminate the target surface saves energy, mitigates light pollution, and intensifies the urban experience of moonlight.

2. Description of Related Art

A great deal of energy is wasted on lighting fixtures and systems which do not take into account the amount of ambient light available to adequately light the target area. Current fixtures and systems allow for a user to turn a light on or off (or even dim a light) depending on the desired need for lighting. But, energy saving lighting fixtures and systems are needed that take into consideration the available ambient light sources and adjust to the light and energy output according to need. Such systems would save significant amounts of energy and light pollution.

Current streetlights are prime examples of wasteful lighting fixtures and systems. Streetlight fixtures and systems produce an excessive amount of illumination to light the intended area, and such "over-illumination" may carry significant costs. For example, typical streetlights use a photocell to turn on at dusk and off at dawn. This practice ignores differences in ambient light levels at night, specifically moonlight. Moonlight varies from 0 lux at a new moon, to 0.35 lux at a full moon. This is a sufficient amount of light for vision in many areas. Therefore, changing the output of streetlights in inverse proportion to ambient moonlight offers the opportunity to save energy. It also enables an aesthetic appreciation of moonlight in urban areas, where this is currently not possible due to light pollution.

Streetlights account for as much as 8% of electricity used in the United States. The cost to produce this amount of electricity is enormous, and it is estimated that the energy production to light streetlamps results in approximately 3,000,000 tons of carbon emissions per year. Current streetlight fixtures and systems also have negative safety and aesthetic impacts. Glare and haze from over-illumination contribute to road accidents and decrease urban populations' ability to experience stars or moonlight on a nightly basis.

The following facts are pertinent to the background of the invention:

1) Moonlight is only $100,000^{th}$ as bright as sunlight. Therefore, a moonlight sensor must be much more sensitive than those used in conventional streetlights.

2) Conventional streetlight photosensors detect ambient light levels, and do not need to measure direct sunlight. Moonlight, however, is sufficiently dim that accurate sensing requires that the sensor be pointed directly at the moon. However, the moon moves through a wide orbital arc each night, so that a typical flat sensor oriented in one direction will receive inaccurate readings due to the changing angle of incidence, depending on the relative position of the moon.

3) A photoreceptor of the necessary sensitivity will be affected by ambient cloud glow from light pollution. At low angles, it may also be affected by direct light from sources such as conventional streetlights and building lights. This is problematic because at low light levels, diffuse, non-directional light is less effective for human vision than direct, shadow-casting light, such as moonlight.

4) Typical High Intensity Discharge lamps used for streetlights do not dim continuously or efficiently.

While it is possible that the energy output for lighting fixtures and systems can be controlled manually (with a dimmer switch for example), such manual switching is often impractical and inefficient. Manual dimming of lighting systems requires the expenditure of significant man hours to collect data relating to the amount of ambient light that is available and to control the dimmer accordingly. Further, dimming an entire system would be ineffective because not every light in a particular system is targeting an area with the same amount of available ambient light. Such ambient light changes can vary spatially and in unpredictable ways. For example, when a cloud passes over a certain area of the lighting system, the lights under the cloud may need to project more light than those that are not under the passing cloud and, even then, the passing cloud would only affect the lighting efficiency of a certain number of lights for a certain period of time.

It is also possible to control energy output for lighting fixtures and systems by using an automatic timer. For example a timer could be set at the source location of the energy output to provide enough energy to coincide with a predicted timed transition of light from sunlight to moonlight and with the expected ambient light output associated with a certain time of year or cycle of the moon. But that system would be limited in that it would likely be unable to detect the specific needs of a certain number of lights on the system depending on positioning of those lights and the changing weather or light producing conditions.

The following is a partial list of the objects and advantages of the present invention: It is an object of the present invention to provide street lighting fixture and system that will sense the amount of ambient light and adjust the power output according to the amount light needed to adequately illuminate the desired target area. It is another object of the present invention to utilize relatively low voltage and adjustable luminaries, such as LEDs, to provide the needed light output. It is another object of the present invention to provide an area lighting fixture that can retro-fit existing streetlight fixtures so as to not detrimentally affect the purposes for which the existing streetlights have been designed, such as staying within an appropriate wind load. It is an object of the present invention to provide an area lighting device that provides a light output that minimizes the occurrence of light pollution. It is an object of the present invention to provide an area lighting device that allows for the maximum use of ambient light, such as moonlight, to illuminate the target area.

It is an object of the present invention to reduce the energy waste and high maintenance cost associated the current lighting fixtures and systems. It is an object of the present invention to present an adaptable, variable lighting fixture and system which takes practical advantage of natural ambient lighting cycles, but celebrates their experiential power.

It is an intention of the invention to present a system utilizing currently available, "off the shelf" and reasonably priced technology that could quickly pay for itself through energy cost savings.

It is an intention of the present invention to achieve technical and operational simplicity.

It is an intention of the present invention to profoundly alter the aesthetics of city life by enhancing the natural lighting of city streets. It is an intention of the present invention to inspire new cycles of culture and urban life—moonlight walks, performances, festivals, weddings and outdoor parties and, thus forge a new urban connection to nature which is temporal rather than spatial.

BRIEF SUMMARY OF THE INVENTION

The present invention generally comprises a method and apparatus to control a lighting source such as a streetlight, and to modulate the output of the lighting source so that artificial illumination is reduced when moonlight is available to illuminate the area. The invention 1) utilizes easily variable light sources such as dimmable white LED modules; 2) replaces or augments their light sensors (i.e. photocells), which activate the lights at twilight, with much more sensitive devices that can detect a range of light conditions; 3) uses simple circuitry to calculate the necessary amount of light output needed to complement the available moonlight levels; and 4) projects the amount of light that is appropriate and most energy efficient for lighting the target area. The lighting fixture and system respond to the regular cycles of twilight, moonrises and phases, and respond to temporary cloud and atmospheric conditions which affect ambient light.

In one aspect, the invention provides a moonlight sensor that is mounted atop or above a streetlight fixture. The moonlight sensor includes a plurality of photodiodes that are mounted on a movable sensor bracket. For example, three photodiodes may be supported so that they are directed outwardly in a common plane and aimed at 90° angular separations. The movable bracket is manually adjusted at installation so that the central one of the three photodiodes is oriented toward the south at an elevation angle equal to the complement of the geographic latitude of the installation, this being the median of the lunar altitude angle. The sensor apparatus is enclosed in a protective transparent or translucent shell, which may be provided with UV and IR filters to prolong the life of the sensors. The sensor apparatus may be packaged to be compatible with a standard twist-lock photocell receptor on a conventional streetlight luminaire for retrofit applications.

The outputs of the three photodiodes are digitized and input to a microprocessor-controlled electronic system.

In order to differentiate between moonlight and artificial light pollution, four approaches can be used, independently or together.

1) The processor can be programmed with an astronomical calculator which predicts lunar phase and brightness, and sun and moon rise and set times. This stored data can be compared to real-time data from the sensors in order to adjust to weather conditions. This also has the advantage of increased engineering redundancy.

2) The digital processor can be programmed to compare the readings from all three sensors in a way that distinguishes diffuse from directional light. In the case of direct light coming from a single source, the photodiodes oriented at a 180° angular separation will never simultaneously be affected. In the case of diffuse light from cloud-scattered light pollution, however, all three sensors will simultaneously register a reading. In general, the average of the readings of the three photodiodes should be fairly constant as the moon moves through the sky, although the sensor oriented closest to the moon's position will register the highest reading, so that the moon may be "tracked". The processor can thus differentiate between direct and diffuse light by comparing sensor inputs.

3) An optical filter can be provided to differentiate light sources. Moonlight is a broad-spectrum light, being simply reflected sunlight. However, sodium and mercury vapor lamps, which are the main sources of urban light pollution, have narrow spectra and can be optically filtered. Such optical filters are used for astronomy applications. Providing such optical filters over the sensors prevents the system from responding to artificial sky glow, or nearby conventional streetlights.

4) The sensor may be physically shielded from light sources near the horizon. Most direct artificial light sources, such as conventional streetlights and buildings, lie within a few degrees of the horizon. Masking these sources prevents the sensors from being affected by ground-source lighting.

DETAILED DESCRIPTION OF THE INVENTION

The present invention generally comprises a method and apparatus to control a lighting source such as a streetlight, and to modulate the output of the lighting source so that artificial illumination is reduced when moonlight is available to illuminate the area. As described below, the apparatus of the invention includes a sensor assembly for detecting moonlight in the night sky, an electronic circuit for processing the sensor signals in combination with moonrise and moonset data, and modulating the power applied to the lighting source in response to the intensity of the incident moonlight.

Figure 1:
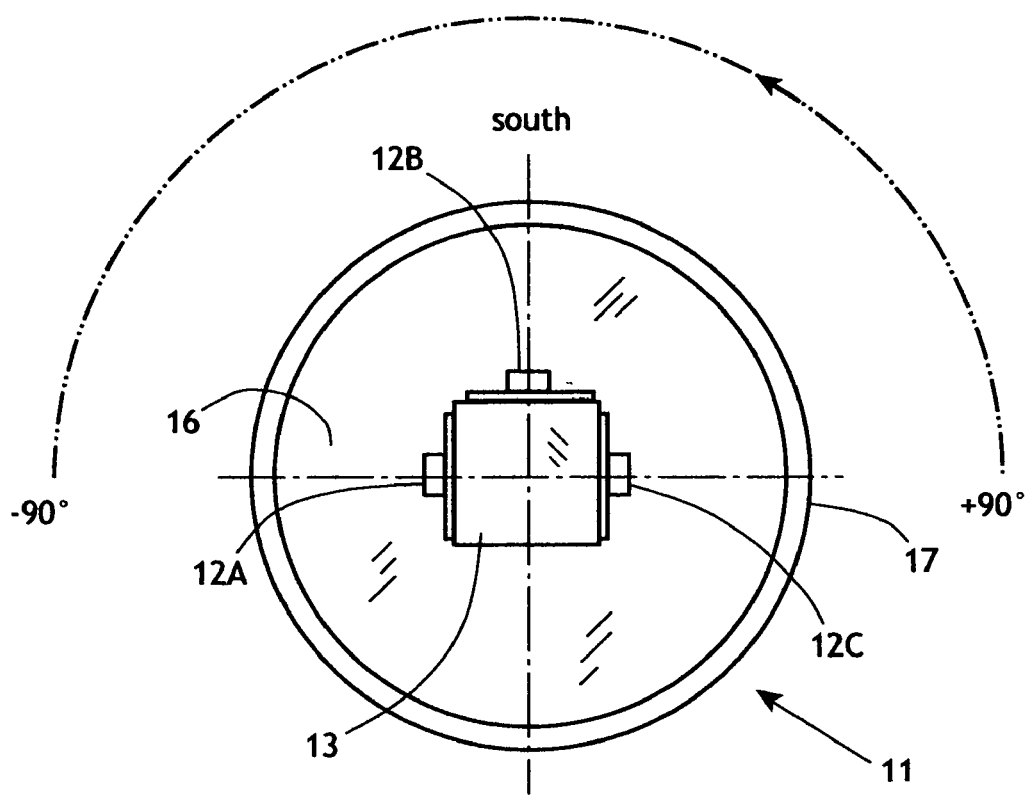
FIG. 1 is a plan view of the sensor assembly of the lunar resonant lighting system of the present invention.
Figure 2:
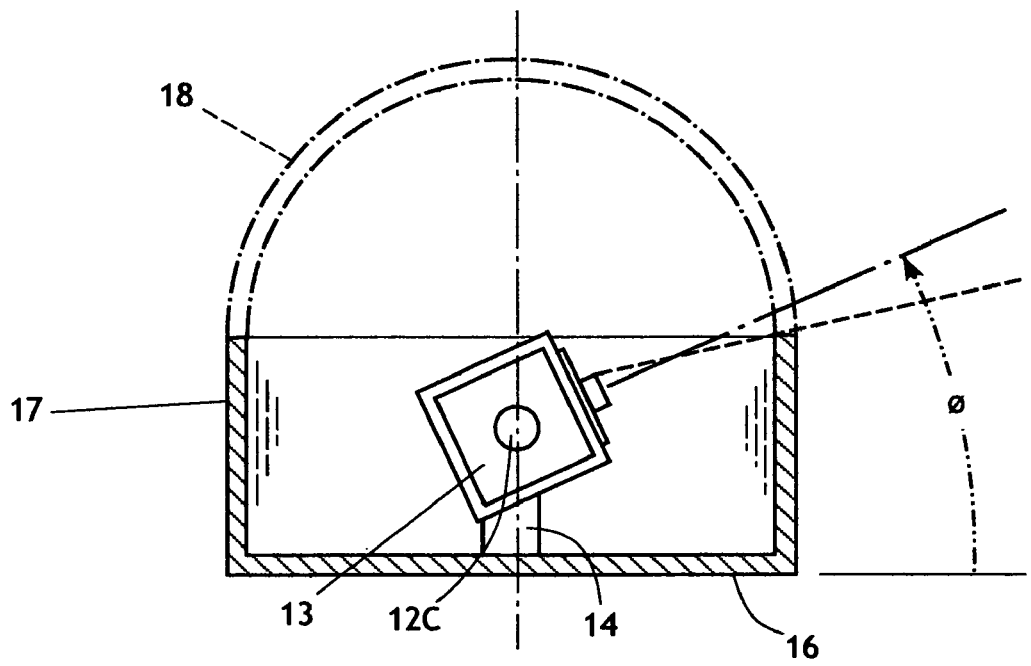
FIG. 2 is a cross-sectional side elevation of the sensor assembly shown in FIG. 1.

With regard to FIGS. 1 and 2, the sensor assembly 11 of the invention generally comprises a sensor array comprised of a trio of photodiodes 12A, 12B, and 12C support on a movable sensor housing 13. The photodiodes are directed outwardly from the housing 13 in a common plane, and are aimed at axes separated by 90°, as shown in FIG. 1. The housing 13 is supported on an adjustable mount 14 extending from a bottom wall 16, and a closed curved sidewall 17 extending upwardly from the bottom wall is spaced apart from the housing 13. The adjustable mount 14 is provided so that the housing 13 may be angularly adjusted so that the plane of the photodiode sensors 12A-12C is elevated above the horizon, preferably at an angle φ equal to the complement of the geographic latitude of the installation, this being approximately the median of the lunar altitude angle.

One example of the photodiodes currently available is the Taos TSL2560 device, which converts the output of the photodiodes to a digital signal and provides I2C serial interface for data transmission. Each photodiode 12A-12C is comprised of two photodiode units, one being a broadband device sensitive to visible and infrared light, and the other sensitive to infrared light only. By combining the signals from these two sensors using an empirical formula provided by the manufacturer, a near-photoptic response is achieved. This is important in that the sensor package is sensitive to the same light as the human eye and will modulate the streetlight output in a manner that comports with human vision.

As shown in FIG. 2, the upper edge of the sidewall 17 extends higher than the level of the photodiodes 12A-12C, so that nearby artificial light sources, which are generally close to the horizon, are masked from the sensors. The sidewall 17 may be augmented in height to block light sources at higher angular elevations at the installation site, or may be reduced if there are no nearby light sources that would otherwise affect the sensors. A protective dome 18 of transparent or translucent material is secured atop the sidewall 17 to protect the sensor apparatus, and the dome may include UV and IR filters to prolong the life of the sensors. Note that the assembly 11 may be dimensioned to be compatible with a standard twist-lock photocell receptor on a conventional streetlight luminaire for retrofit applications.

Figure 3:
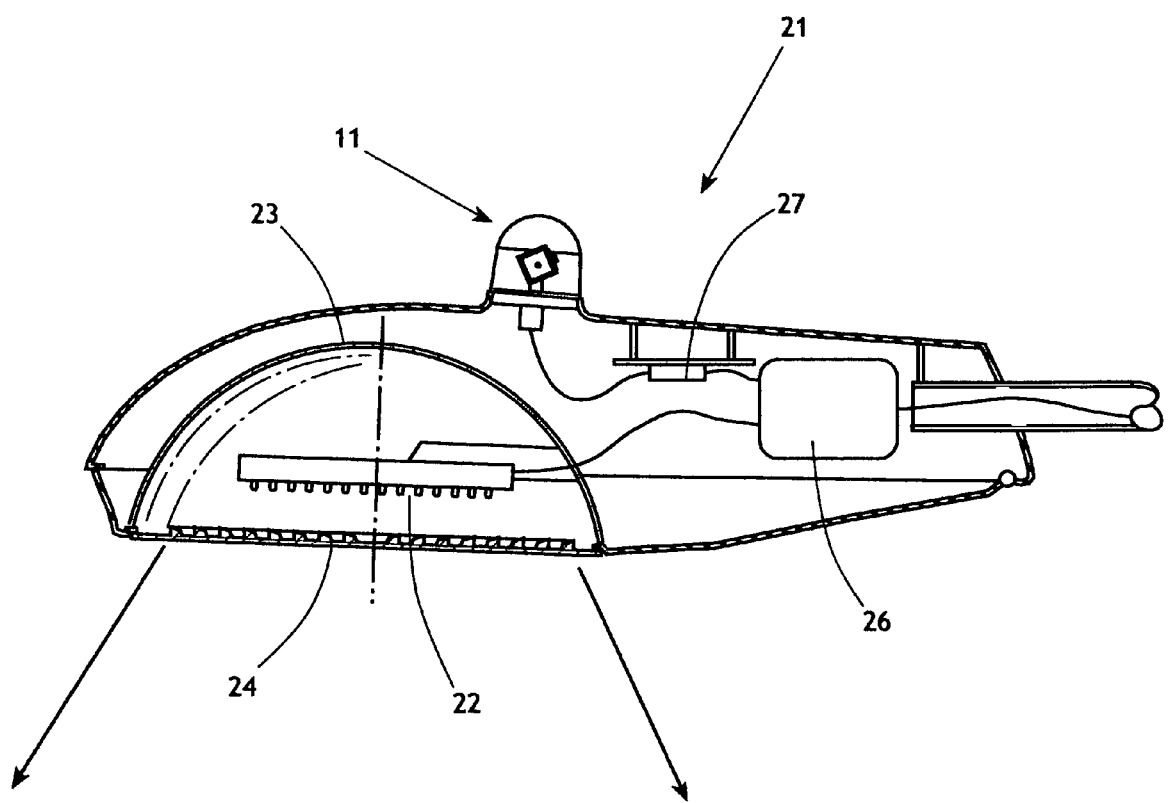
FIG. 3 is a cross-sectional side elevation of a typical streetlight fixture equipped with the lunar resonant lighting system of the present invention.

With regard to FIG. 3, a typical streetlight fixture 21 that incorporates the present invention includes, in addition to the usual structural elements, standard components such as an LED array 22 to provide illumination, a reflector 23 to direct the illumination downwardly toward a ground surface, and a lens 24 to direct the illumination in a desired pattern to the area being illuminated. The sensor assembly 11 may be secured atop the fixture 21 in the standard twist-lock receptacle provided for daylight sensors. In addition, a power source 26 (such as a transformer and rectifier) is secured within the fixture and is connected to a microprocessor controlled dimmer unit 27, which in turn is connected to receive signals from the sensor assembly 11 and to deliver modulated power to the LED array 22. Other configurations and arrangements of the basic components are within the scope of the invention.

Figure 4:
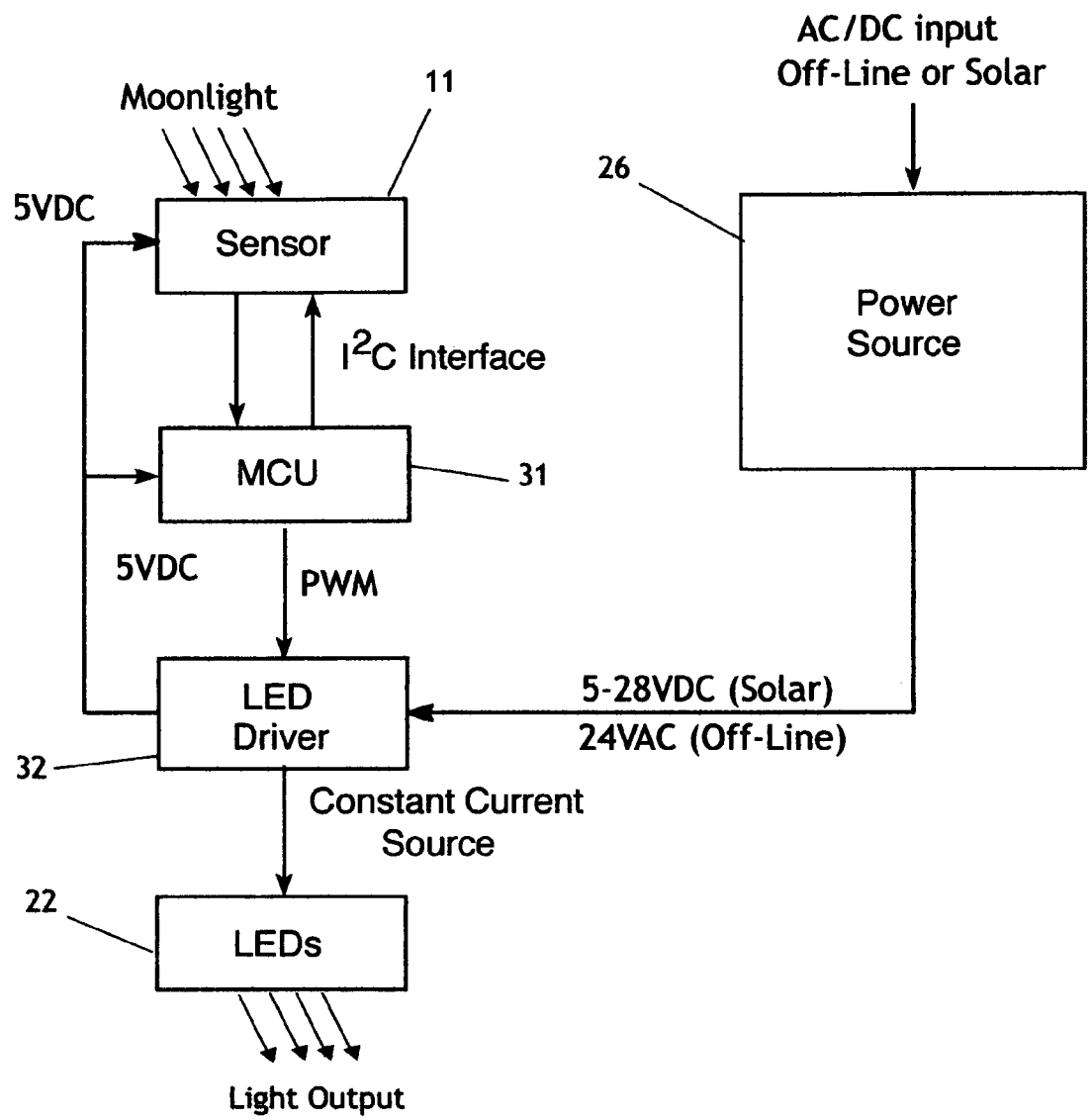
FIG. 4 is a functional block diagram depicting the major components of the lunar resonant lighting system of the present invention.

With regard to FIG. 4, the dimmer unit 27 includes a microprocessor 31 that has an I²C interface to receive signals from the sensor module 11 described above. The processor may be programmed with an astronomical calculator which predicts lunar phase and brightness, and sun and moon rise and set times. This stored data can be compared to real-time data from the sensors in order to adjust to weather conditions. This also has the advantage of increased engineering redundancy. One example of the microprocessor currently available is a PIC16F872, which incorporates sufficient memory for the functions described below, low power consumption, and extended temperature tolerance. The microprocessor 31 is programmed to generate a pulse width modulated signal (PWM) that is tailored to vary the nighttime illumination in the presence or absence of moonlight, as described below. The PWM signal is fed to an LED driver 32, which in turn delivers the operating power to the LED array 22. The LED driver 32 may be an off-the-shelf unit that provides constant current that is pulse width modulated at a frequency above the flicker threshold of human vision. The power source 26 provides DC power to operate the sensors assembly 11, the MCU 31, and the LED driver 32, and provides constant current through the LED driver 32 to the LED's 22.

Figure 5:
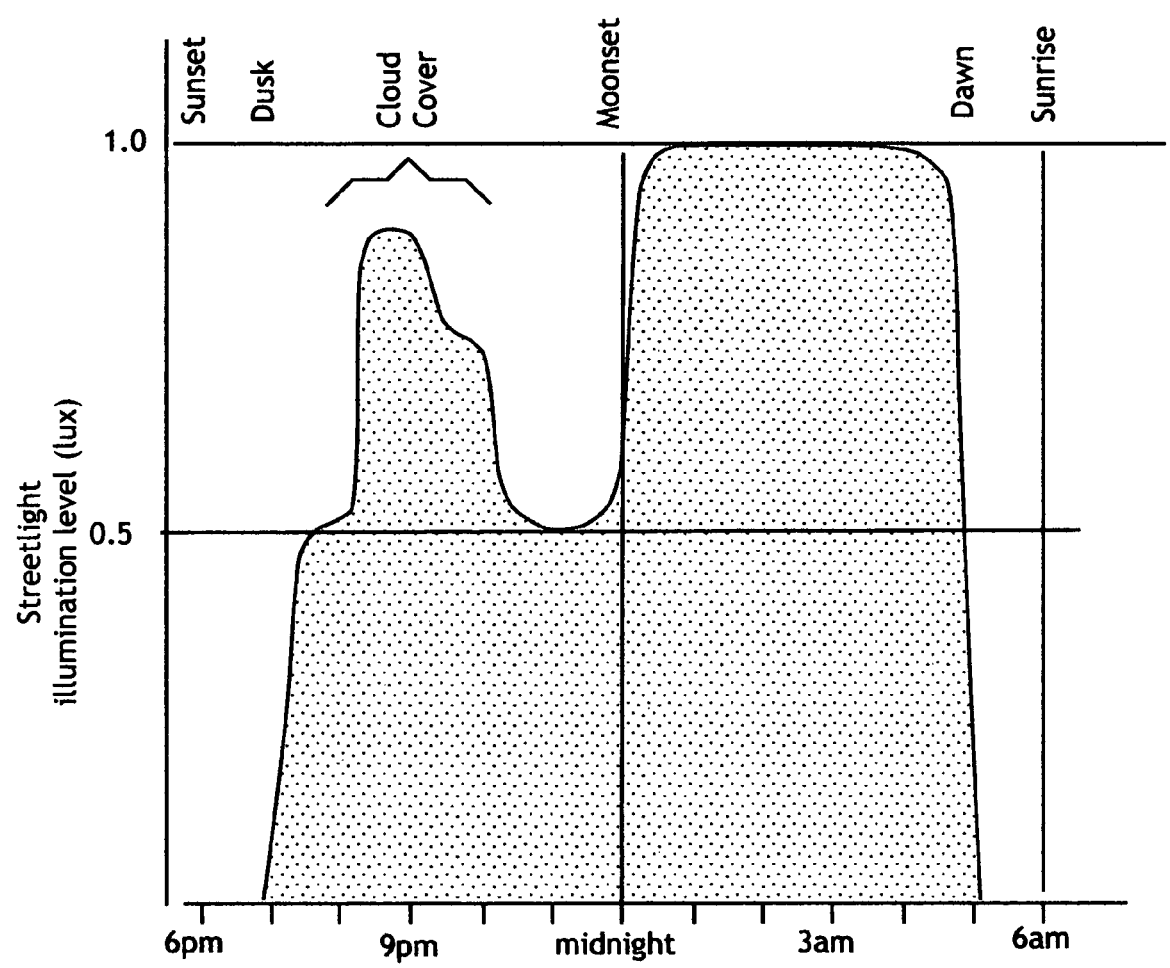
FIG. 5 is a graphical depiction of a typical illumination pattern of a streetlight fixture using the lunar resonant lighting system of the present invention.
Figure 6:
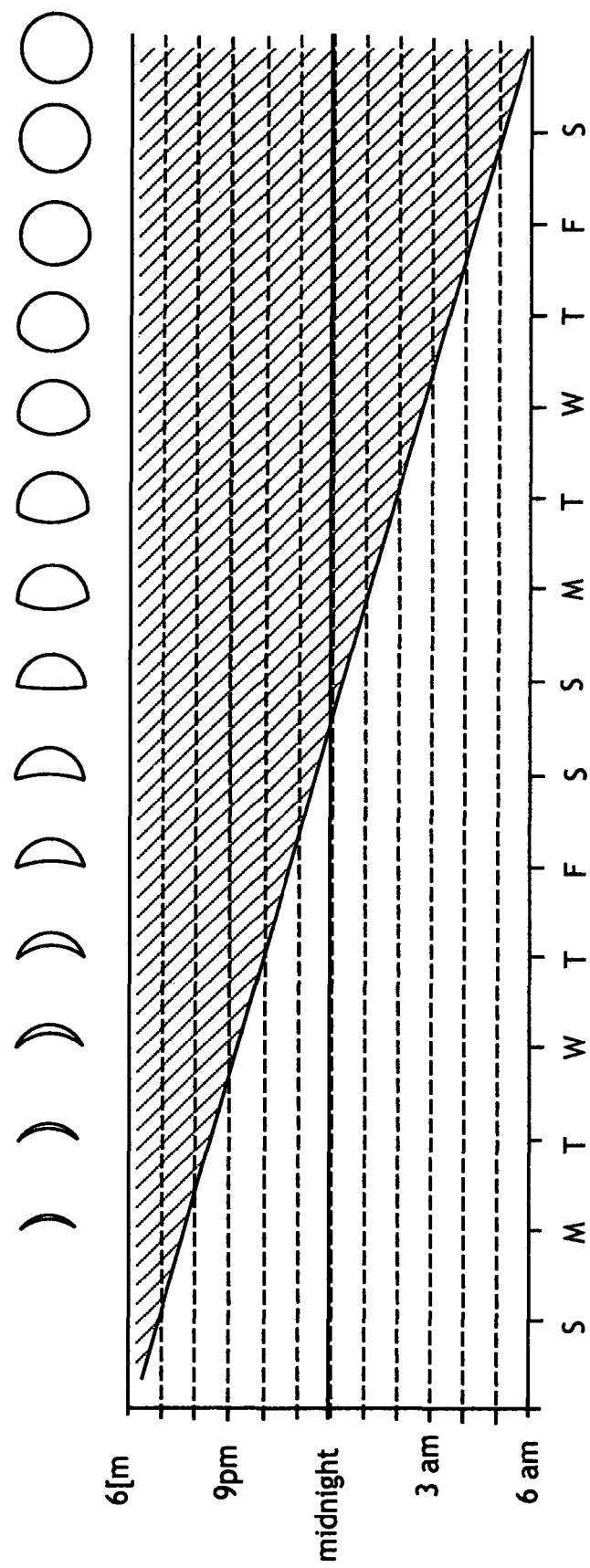
FIG. 6 is a chart depicting the amount of moonlight during a typical lunar sequence extending from a new moon to a full moon.

With regard to FIG. 6, it may be noted that there is no moonlight at a new moon, and the number of hours of moonlight increases generally linearly as the lunar cycle progresses toward the full moon. It may be appreciated that the amount of moonlight available on any given night is a function not only of the well-known lunar cycle (new moon to full moon in approximately 14 days), but also weather variables (clouds, fog, etc.) and atmospheric conditions such as smoke, mist, and the like. Thus the purpose of the invention is to modulate the output of the streetlight during periods when moonlight is falling on the area being illuminated by the streetlight, and the streetlight output is attenuated in response to the moonlight being received. As shown in FIG. 5, an exemplary evening near an equinox, at the midpoint in the lunar cycle includes moonrise before dusk, and moonset at midnight. The streetlight turns on at dusk, and the light output ramps up as the sky darkens. If, for example, there is some cloud cover that obscures the moon, the light output will rise toward the maximum 1.0 lux level. When the cloud cover wanes (in this example from 10 pm to midnight), the illumination effect of moonlight is allowed to assert itself, and the streetlight output is attenuated down to approximately 0.5 lux. At midnight the moon sets, and the streetlight output is ramped up to the maximum until the sky brightens at dawn, when the streetlight is turned off. Of course, on an evening of a full moon, the moon rises just at sunset, and moonlight is available for the entire night, unless clouds and the like are present.

Figure 7:
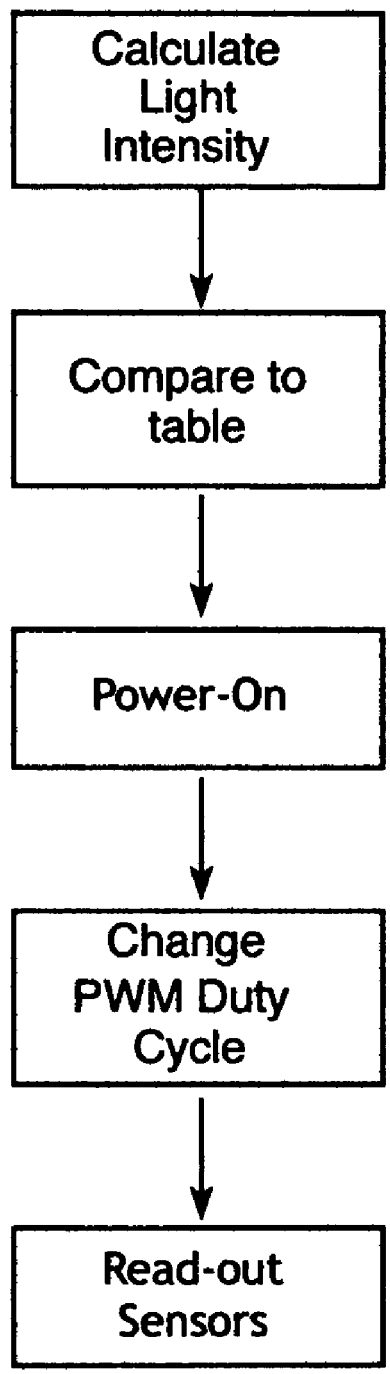
FIG. 7 is a flow chart depicting the steps required to achieve lunar resonant lighting in accordance with the present invention.

With regard to FIG. 7, the method of the invention that is carried out by the apparatus described above includes receiving the inputs from the sensor assembly 11, and calculating the light intensity incident on the streetlight fixture. The digital processor can be programmed to compare the readings from all three sensors in a way that distinguishes diffuse from directional light. In the case of direct light coming from a single source, sensors 12A and 12C will never simultaneously be affected. In the case of diffuse light from cloud-scattered light pollution, however, all three sensors will simultaneously register a reading. In general, the average of the readings of the three photodiodes should be fairly constant as the moon moves through the sky, although the sensor oriented closest to the moon's position will register the highest reading, so that the moon may be "tracked" as it moves through the night sky. The processor can thus differentiate between direct and diffuse light by comparing sensor inputs. The ambient light level is then compared to a table of astronomical data that indicates sunrise and sunset, moonrise and moonset, so that the system may be augmented in discriminating between ambient light pollution and moonlight, but only during nighttime when the system is operating. If the sensor signals and the lookup table data are in accord, the MCU 31 switches out of sleep mode and turns on the LED driver 32 to operate the LEDs 22. The system also calculates the PWM duty cycle to tailor the LED output, as suggested in FIG. 5, to accommodate and adjust for incident moonlight. The system may define 5 LED light intensities; from off to full brightness. The software may operate in a loop, periodically reading out the sensors and comparing values to the table. When a threshold is crossed, the light output will change at a predetermined ramp rate to the new discrete set-point.

It may be appreciated that the invention may also be used with light sources other that LEDs, such as incandescent lamps, induction lamps, dimmable ballast HID or fluorescent lamps. Also, some lighting systems are networked to operate in unison, through such arrangements as parallel wiring, radio signal controls, power line modems, and the like. In these arrangements a single sensor assembly may be connected to control a group of light sources.

The foregoing description of the preferred embodiments of the invention, has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A lunar resonant lighting system, including:
    illumination means for casting a variable intensity illumination;
    power supply means for supplying operating power to said illumination means;
    sensor means for detecting moonlight in the night sky and generating a moonlight signal that varies with the intensity of moonlight;
    said power supply means receiving said moonlight signal and varying said operating power in an inverse relationship to said intensity of moonlight;
    said sensor means including at least one photosensor directed upwardly toward the sky generally at an elevation angle that is the complement of the latitude angle of the geographical location of said system;
    further including a pair of secondary photosensors directed generally toward the horizon and in diametrically opposed directions, said microprocessor being programmed to process signals from all of said photosensors to determine average background sky illumination and compare said average sky illumination to the strongest signal from any one of said photosensors to determine said intensity of moonlight.

2. The lunar resonant lighting system of claim 1, further including masking means for blocking artificial light sources from affecting said at least one photosensor and said pair of secondary photosensors.

3. The lunar resonant lighting system of claim 2, wherein said masking means comprises a curved sidewall circumscribing at least a portion of said sensor means and disposed to block said artificial light sources at low elevation angles with respect to said sensor means.

4. The lunar resonant lighting system of claim 1, wherein said power supply means includes a microprocessor programmed to receive said moonlight signal and to generate a pulse width modulated power control signal having a duty cycle that varies inversely with the magnitude of said moonlight signal.

5. The lunar resonant lighting system of claim 4, wherein said microprocessor is programmed with an astronomical calculator that predicts lunar phase and brightness, and said moonlight signal is compared with said lunar phase and brightness to enable variation of said illumination intensity only between times of moon rise and moon set during the night.

6. The lunar resonant lighting system of claim 1, wherein said sensor means is enclosed in a housing dimensioned to be received in a sensor receptacle of a streetlight luminaire.

7. The lunar resonant lighting system of claim 6, wherein said housing includes a dome enclosure having optical filter means with a selective passband.

8. The lunar resonant lighting system of claim 6, wherein said luminaire includes a plurality of high intensity LED light sources.

9. The lunar resonant lighting system of claim 1, wherein said illumination means includes a light source selected from a group containing: LEDs, incandescent lamps, induction lamps, dimmable ballast HID or fluorescent lamps.

10. A method for lunar resonant lighting, including the steps of:
    providing a variable light source for illumination;
    providing operating power to said variable light source;
    detecting moonlight in the night sky; and,
    varying said operating power to said variable light source in an inverse relationship to the intensity of the moonlight;
    further including the step of providing a trio of photodetectors aimed at the sky and diverging angularly from each other, calculating an average of the signals from all of said photodetectors, and comparing the strongest individual signal from any of said photodetectors to said average to determine the location of the moon in the night sky.

11. The method for lunar resonant lighting of claim 10, further including acquiring data on lunar phase and brightness, and enabling the varying of said operating power only when the moon is shining in the night sky.

12. The method for lunar resonant lighting of claim 10, further including excluding artificial illumination sources from the step of detecting moonlight in the night sky.

13. The method for lunar resonant lighting of claim 10, wherein said step of varying said operating power includes providing a pulse width modulated power signal to said variable light source and varying the duty cycle of said pulse width modulated power signal.

* * * * *